(12) United States Patent
Guntoro et al.

(10) Patent No.: US 11,645,502 B2
(45) Date of Patent: May 9, 2023

(54) MODEL CALCULATION UNIT AND CONTROL UNIT FOR CALCULATING AN RBF MODEL

(71) Applicant: Robert Bosch GmbH, Stuttgart (DE)

(72) Inventors: Andre Guntoro, Weil der Stadt (DE); Ernst Kloppenburg, Ditzingen (DE); Heiner Markert, Stuttgart (DE); Holger Ulmer, Ulm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1099 days.

(21) Appl. No.: 16/330,952

(22) PCT Filed: Sep. 5, 2017

(86) PCT No.: PCT/EP2017/072137
§ 371 (c)(1),
(2) Date: Mar. 6, 2019

(87) PCT Pub. No.: WO2018/046453
PCT Pub. Date: Mar. 15, 2018

(65) Prior Publication Data
US 2019/0258922 A1    Aug. 22, 2019

(30) Foreign Application Priority Data

Sep. 7, 2016  (DE) .......................... 102016216952.1
Sep. 4, 2017  (DE) .......................... 102017215420.9

(51) Int. Cl.
| | |
|---|---|
| *G06N 3/063* | (2023.01) |
| *B60W 10/06* | (2006.01) |
| *G05D 1/00* | (2006.01) |
| *G06N 3/04* | (2023.01) |

(52) U.S. Cl.
CPC ............. *G06N 3/063* (2013.01); *B60W 10/06* (2013.01); *G05D 1/0088* (2013.01); *G06N 3/04* (2013.01)

(58) Field of Classification Search
CPC ...... B60W 10/06; B60W 10/08; B60W 10/04; G05D 1/0088; G06N 3/0427;
(Continued)

(56) References Cited

U.S. PATENT DOCUMENTS

| 10,146,248 B2 * | 12/2018 | Lang ...................... G06F 7/5443 |
| 2006/0013475 A1 * | 1/2006 | Philomin ............ G06F 18/2414 |
| | | 382/156 |

(Continued)

FOREIGN PATENT DOCUMENTS

| JP | H04293626 A | 10/1992 |
| JP | H10504667 A | 5/1998 |

(Continued)

OTHER PUBLICATIONS

International Search Report for PCT/EP2017/072137, dated Dec. 8, 2017.

(Continued)

*Primary Examiner* — Babar Sarwar
(74) *Attorney, Agent, or Firm* — Norton Rose Fulbright US LLP; Gerard Messina

(57) ABSTRACT

A model calculation unit for calculating an RBF model is described, including a hard-wired processor core designed as hardware for calculating a fixedly predefined processing algorithm in coupled functional blocks, the processor core being designed to calculate an output variable for an RBF model as a function of one or multiple input variable(s) of nodes V[j,k], of length scales (L[j,k]), of weighting parameters p3[j,k] predefined for each node, the output variable being formed as a sum of a value calculated for each node (Continued)

V[j,k], the value resulting from a product of a weighting parameter p3[j,k] assigned to the particular node V[j,k], and a result of an exponential function of a value resulting from the input variable vector as a function of a square distance of the particular node (V[j,k]), weighted by the length scales (L[j,k]), the length scales (L[j,k]) being provided separately for each of the nodes as local length scales.

8 Claims, 2 Drawing Sheets

(58) Field of Classification Search
CPC .. G06N 3/0436; G06N 3/0445; G06N 3/0454; G06N 3/0635; G06N 3/08; G06N 3/082; G06N 3/086; G06N 3/04; G06N 3/063
See application file for complete search history.

(56) References Cited

U.S. PATENT DOCUMENTS

| | | | |
|---|---|---|---|
| 2007/0022068 A1* | 1/2007 | Linsker | G05B 13/026 706/23 |
| 2007/0203616 A1* | 8/2007 | Borrmann | G06N 3/048 701/1 |

FOREIGN PATENT DOCUMENTS

| | | | |
|---|---|---|---|
| WO | 96/06400 A1 | 2/1996 | |
| WO | WO-2018046422 A1 * | 3/2018 | ........... G05B 13/027 |

OTHER PUBLICATIONS

Eppler W et al., "High Speed Neural Network Chip for Trigger Purposes in High Energy Physics", Design, Automation and Test in Europe, Proceedings Paris, France, Los Alamitos, CA, USA, Comput. Soc, 1998, pp. 108-115, XP010268412.

Richard Fiifi Turkson et al., "Artificial Neural Network Applications in the Calibration of Spark-Ignition Engines: An Overview", Engineering Science and Technology, an International Journal, vol. 19, No. 3, 2016, pp. 1346-1359, XP055420859.

"Introduction to Interpolated Neural Networks" APR Power White paper, Jan. 18, 2009, pp. 1-57.

Imai, Masaharu: "HS/SW Codesign and Soft Hardware," Information Processing, Japan, 40(8):2-8, Issue No. 414, (1999), Incorporated Information Processing Society.

* cited by examiner

MODEL CALCULATION UNIT AND CONTROL UNIT FOR CALCULATING AN RBF MODEL

FIELD OF THE INVENTION

The present invention relates to the calculation of functional models in a separate hard-wired model calculation unit, in particular for calculating radial basis function (RBF) models with local length scales.

BACKGROUND INFORMATION

Functions of controllers of technical systems, such as internal combustion engines, electric drives, battery stores and the like, are frequently implemented using models which represent a mathematical image of the real system. In the case of physical models, in particular with complex relationships, however, the necessary calculation accuracy is lacking, and given today's computing capacities, it is generally difficult to calculate such models within the real time requirements necessary for a control unit. For such cases, it is envisaged to utilize data-based models which exclusively describe relationships between an output variable and input variables based on training data obtained with the aid of a test bench or the like. In particular, data-based models are suitable for modeling complex relationships in which multiple input variables, between which interdependencies exist, are taken into consideration in the model in a suitable manner.

Data-based functional models are generally based on a large number of nodes to achieve sufficient modeling accuracy for the particular application. Given the high number of nodes, a high computing capacity is required for calculating a model value with the aid of a data-based functional model, such as a Gaussian process model. To be able to calculate such a data-based functional model in real time in a control unit application, model calculation units based on a hardware design may thus be provided.

SUMMARY

According to the present invention, a model calculation unit for calculating an RBF model, and a control unit and a use of the control unit are provided.

According to a first aspect, for the calculation of an RBF model with the aid of a hard-wired processor core designed as hardware for the calculation of a fixedly predefined processing algorithm in coupled functional blocks is provided, the processor core being designed to calculate an output variable for an RBF model as a function of one or multiple input variable(s) of an input variable vector of nodes, of length scales, of weighting parameters predefined for each node, the output variable being formed as a sum of a value calculated for each node, the value being a product of a weighting parameter assigned to the particular node and a result of an exponential function of the negative value resulting from the square distance of the particular node, weighted by the length scales, from the input variable vector, the length scales being provided separately for each of the nodes as local length scales.

One idea of the above model calculation unit is to design it for calculating an RBF model in hardware structures separately in a processor core in a control unit. In this way, an essentially hard-wired hardware circuit may be provided for the implementation of functions, which makes it possible to calculate an RBF model while causing only a very low processing load in a software-controlled microprocessor of a control unit in the process. As a result of the hardware acceleration provided by the model calculation unit, the RBF model may also be calculated in real time, so that the use of such a model becomes of interest for control unit applications for internal combustion engines in motor vehicles.

Moreover, the use of RBF models allows a data-based modeling using a lower number of nodes than with comparable data-based models, such as a Gaussian process model.

The above model calculation unit provides one embodiment which makes it possible to calculate an RBF model with the aid of both dimension-based and local length scales. Through the use of local length scales, it is also possible to map RBF models which have an increased curviness and locally high gradients.

Furthermore, the processor core may include a state machine, a memory for storing the one or multiple input variable(s) of the input variable vector, the nodes, the length scales, the parameters predefined for each node and the output variable, one or more processing operation blocks, in particular a MAC block (MAC: multiply-accumulate for fixed point calculations or FMA: fused-multiply-add for floating point calculations) and an exponential function calculation block.

Furthermore, the model calculation unit may be designed to utilize purely dimension-based length scales instead of the local length scales as a function of a selection variable for the calculation of the output variable.

According to one specific embodiment, the processor core may be formed in a surface area of an integrated module.

According to one further aspect, a control unit including a microprocessor and the above model calculation unit is provided. In particular, the control unit may be designed as an integrated circuit.

According to one further aspect, a use of the above control unit as a control unit for controlling an engine system in a motor vehicle is provided.

DETAILED DESCRIPTION

Figure 1:
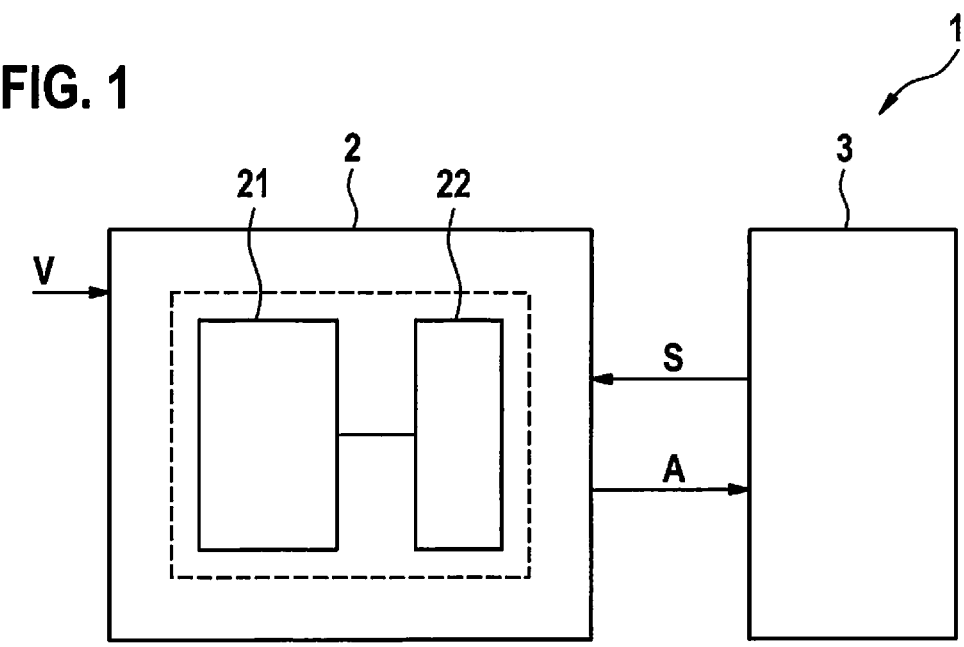
FIG. 1 shows a schematic representation of a control unit for use for an engine system in a motor vehicle

FIG. 1, by way of example, shows a schematic representation of a control unit 2 for an engine system 1 including an internal combustion engine 3 as a technical system to be controlled. Control unit 2 includes a microprocessor 21 and a model calculation unit 22, which may be designed as separate components or in an integrated manner in separate surface areas on a chip. In particular, model calculation unit 22 represents a hardware circuit, which may be structurally separated from a processor core of microprocessor 21.

Model calculation unit 22 is essentially hard-wired and accordingly not designed like microprocessor 21 to execute software code and thereby execute a variable function predefined by software. In other words, no processor is provided in model calculation unit 22 so that it is not operable by software code. By focusing on a predefined model function, a resource-optimized implementation of such a model calculation unit 22 is made possible. In an integrated design, model calculation unit 22 may be implemented in a surface area-optimized manner, which additionally makes fast calculations possible.

Control unit 2 is essentially used to process sensor signals S or sensor variables detected by a sensor system in internal combustion engine 3 and/or external specifications V and to apply values of one or multiple corresponding activation variable(s) A to internal combustion engine 3 cyclically at fixedly predefined time intervals of, e.g., 1 to 100 ms or with angular synchronism as a function of a crankshaft angle of an operated internal combustion engine, so that the internal combustion engine is operable in a manner known per se.

Figure 2:
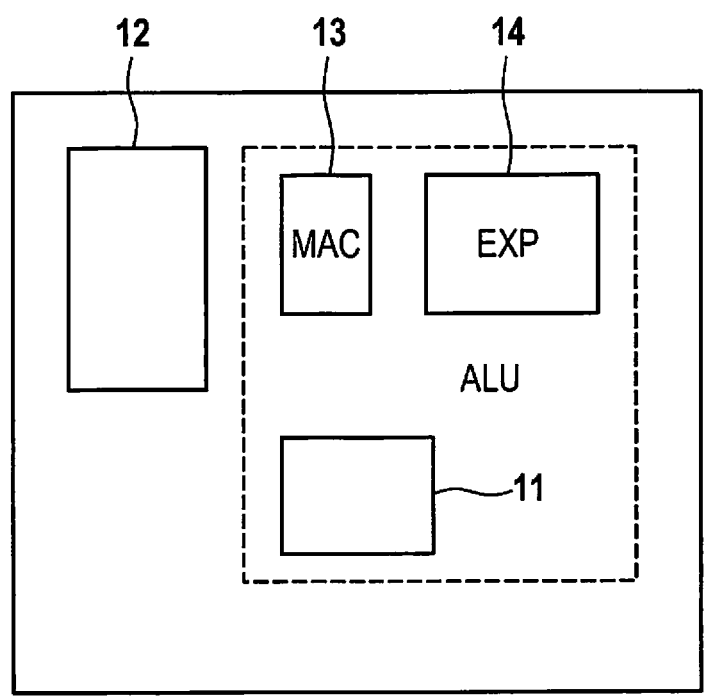
FIG. 2 shows a schematic representation of a calculation unit as part of the control unit.

FIG. 2 shows a model calculation unit 22 in greater detail. Model calculation unit 22 includes a state machine 11, a memory 12 and one or multiple operation block(s), which include, for example, one or multiple MAC block(s) 13 and an exponential function calculation block (EXP) 14 for calculating an exponential function. State machine 11 and the one or multiple operation block(s) 13, 14 form a processor core ALU of model calculation unit 22. In addition or as an alternative to the MAC block, the operation blocks may include a multiplication block and an addition block.

With the aid of state machine 11, values of input variables stored in an input variable memory area of memory 12 may be calculated by repeated loop calculations to obtain output variables, which are written into a corresponding output variable memory area of memory 12.

State machine 11 is designed to calculate an RBF model. State machine 11 may be described based on the following pseudo code:

```
/* Input transformation */
for (k=0; k<p7; k++) {
  ut[k] = u[k]*p1[k] + p2[k];
}
/* Loop calculation */
for (j=p8; j<p6; j++) {
  i = j * p7;
  t = 0.0f;
  for (k=0; k<p7; k++) {
    d = V[i+k] - ut[k];
    t += d * d * L[k];
  }
  y[0] += p3[j] * exp(-t);
}
/* Output transformation */
z[0] = y[0] * p4[0] + p5[0];
``` where
p7: maximum index value for the input variables of the input variable vector, indicates the dimension of the input variable vector
p8: minimum index value (normally zero, except in the case of interruption and continuation of the calculation)
p6: maximum index value (number of nodes)
p3: parameter of the RBF model
u: input variables
ut: transformed input variables
L: dimensional inverse square length scales
V: training points or nodes
p1, p2: variables for the input transformation for each of the input variables of the input variable vector
p4, p5: variables for the output transformation with dimension 1 (singleton)

With the aid of the above pseudo code, the following calculation for the RBF model may be carried out:

$$y[0] = \Sigma_{j=0}^{p6-1}(p3[j] \cdot \exp(-\Sigma_{k=0}^{p7-1} L[k] \cdot (V[j,k]-ut[k])^2))$$

Figure 3:
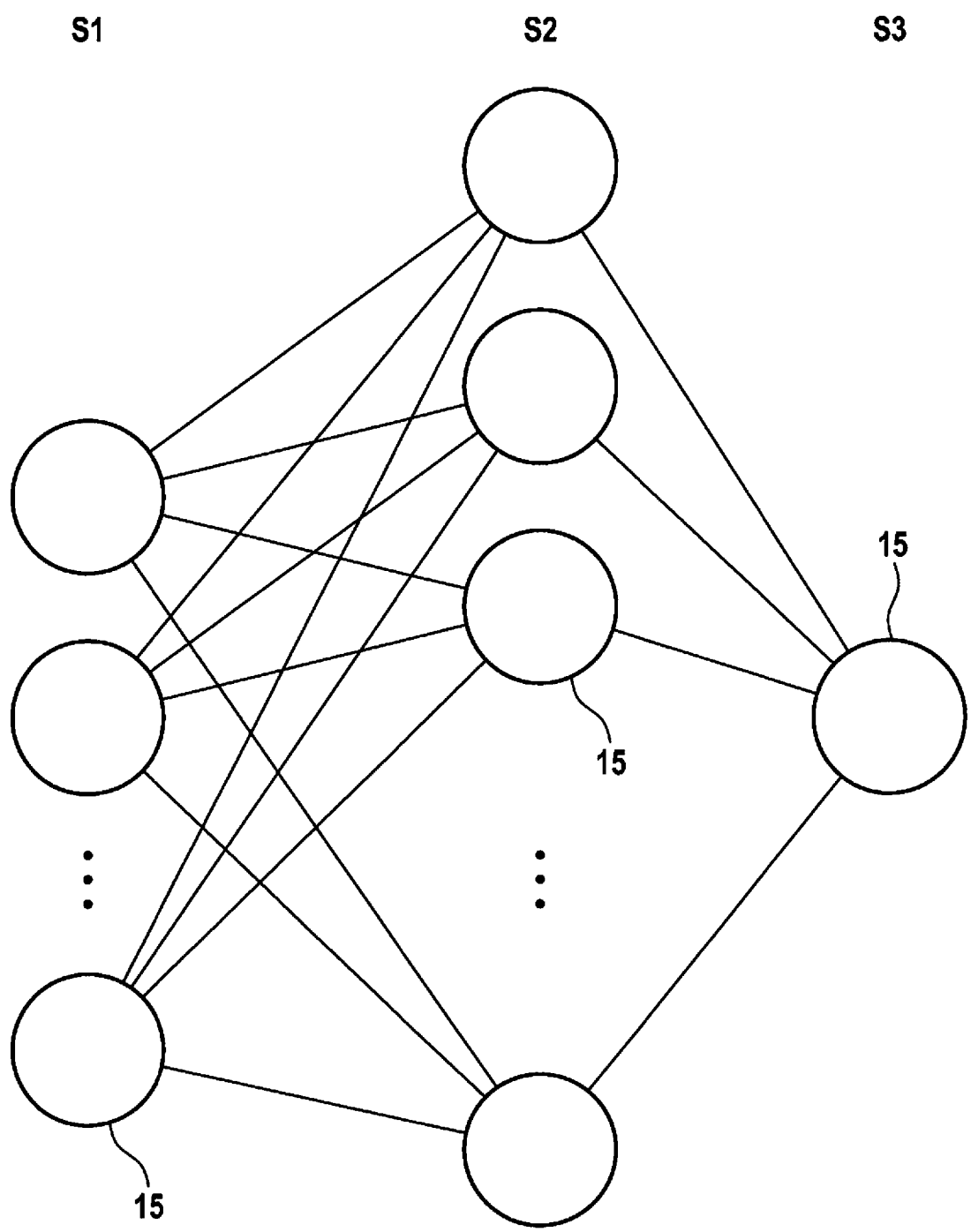
FIG. 3 shows a schematic representation of a neuron configuration of an RBF model.

As is graphically represented in FIG. 3, the RBF function essentially corresponds to a special form of a neural network including three layers, i.e., an input layer S1 including p7 neurons 15 for an input variable vector including p7 input variables, an intermediate layer S2 including a number of p6 neurons 15, with a radial square function as the activation function, and an output layer S3 including a neuron 15 and with a linear activation function.

It is possible to carry out an input and/or output transformation of the input variables of the input variable vector or of the output variables of the output variable vector with the aid of the standardization variables p1 and p2 predefined for each element of the input variable vector, or for output variables p4 and p5.

The calculation of the RBF model allows a lean design of model calculation unit 22, so that its space requirement is low in an integrated design.

To be able to calculate an RBF model with the aid of local length scales, a separate value of the length scales may be provided for each node. This may be useful for RBF models having gradients which deviate significantly from one another at the nodes. The local length scales are thus predefined separately for each node.

In contrast to the above formula, the RBF models are calculated as follows with the aid of local length scales:

$$y[0] = \Sigma_{j=0}^{p6-1}(p3[j] \cdot \exp(-\Sigma_{k=0}^{p7-1} L[j,k] \cdot (V[j,k]-ut[k])^2))$$

```
/* Input transformation */
for (k=0; k<p7; k++) {
  ut[k] = u[k]*p1[k] + p2[k];
}
/* Loop calculation */
for (j=p8; j<p6; j++) {
  i = j *p7;
  t = 0.0f;
  for (k=0; k<p7; k++) {
    d = ut[k] - V[i+k];
    n = (cfg_rbf_local) ? i+k : k;
    t += d * d * L[n];
  }
  y[0] += p3[j] * exp(-t);
}
/* Output transformation */
for (k=0; k<p9; k++) {
  z[k] = y[k] * p4[k] + p5[k];
}
```

Variable cfg_rbf_local indicates whether local inverse square length scales L[n] or, as described above, only one length scale value per dimension are to be used. For the local length scale values and the purely dimension-specific length scale values, a dedicated memory area is reserved, depending on design, from which the corresponding values are drawn as a function of variable cfg_rbf_local during the calculation of the RBF model. In this way, it is possible to calculate the RBF model both with the aid of local length scale values and with the aid of purely dimension-specific length scale values. This enables flexibility of the function selection as a function of the curviness of the system to be modeled.

The formula for the model calculation in general includes a set of parameters which may be determined in a model training. Standardization parameters p5, p4, p1, p2 result directly from the mean deviation and the standard deviation of the training data. The weights of the cores (kernels or nodes) p3, the centers of the cores V and the length scale core parameters L are preferably optimized using a least squares method, which minimizes the squared deviations (residuals) between the model predictions and the given data set. To expedite the teaching of the model, deviations of the model parameters regarding the loss function are also taken into consideration in one preferred embodiment. If the number of cores is large, the modeling approach may be prone to overfitting. It is therefore proposed to appropriately adapt the number of parameters in a comparison check. Very high values for length scale parameters L may also result in overfitting. This may be prevented by limiting the parameters to a maximum upper limit.

What is claimed is:

1. A model calculation unit for calculating a radial bias function (RBF) model, comprising:
a hard-wired processor core including hardware for calculating a fixedly predefined processing algorithm for calculating the RBF model using coupled function blocks, the hardware including a state machine to control the calculating of the fixedly predefined processing algorithm by the coupled function blocks without executing software code, wherein the hard-wired processor core is configured to calculate the RBF model for controlling a technical system in a motor vehicle based on the RBF model, and wherein:
the hard-wired processor core calculates an output variable for the RBF model as a function of: at least one input variable of an input variable vector, nodes (V[j,k]), length scales (L[j,k]), and weighting parameters (p3[j]) predefined for each node;
the output variable is formed as a sum of a value calculated for each node, the value resulting from a product of the weighting parameter assigned to a particular node and an exponential function of a value resulting from a square distance of the particular node from the input variable vector, weighted by the length scales; and
the length scales are provided separately for each of the nodes as local length scales.

2. The model calculation unit as recited in claim 1, wherein the length scales are provided separately for each of the nodes as local length scales and for each of the at least one input variable of the input variable vector.

3. The model calculation unit as recited in claim 1, wherein the coupled function blocks include a multiply-accumulate (MAC) block and an exponential function calculation block, the model calculation unit further comprising a memory for storing the at least one input variable of the input variable vector, the nodes, the length scales, the weighting parameters predefined for each node, and the output variable.

4. The model calculation unit as recited in claim 1, wherein the hard-wired processor core is formed in a surface area of an integrated module.

5. The model calculation unit as recited in claim 1, wherein purely dimension-specific length scales are utilized instead of the local length scales as a function of a selection variable for the calculation of the output variable.

6. A control unit, comprising:
a microprocessor;
at least one model calculation unit for calculating a radial bias function (RBF) model, the at least one model calculation unit including:
a hard-wired processor core including hardware for calculating a fixedly predefined processing algorithm in coupled function blocks, the hardware including a state machine to control the calculating of the fixedly predefined processing algorithm by the coupled function blocks without executing software code, wherein:
the hard-wired processor core calculates an output variable for the RBF model as a function of: at least one input variable of an input variable vector, nodes (V[j,k]), length scales (L[j,k]), and weighting parameters (p3[j]) predefined for each node;
the output variable is formed as a sum of a value calculated for each node, the value resulting from a product of the weighting parameter assigned to a particular node and an exponential function of a value resulting from a square distance of the particular node from the input variable vector, weighted by the length scales; and
the length scales are provided separately for each of the nodes as local length scales,
wherein the control unit is configured to control a technical system in a motor vehicle based on the calculating of the RBF model.

7. The control unit as recited in claim 6, wherein the control unit includes an integrated circuit.

8. The control unit as recited in claim 6, wherein the control unit controls an engine system in a motor vehicle.

* * * * *